Figure 1:
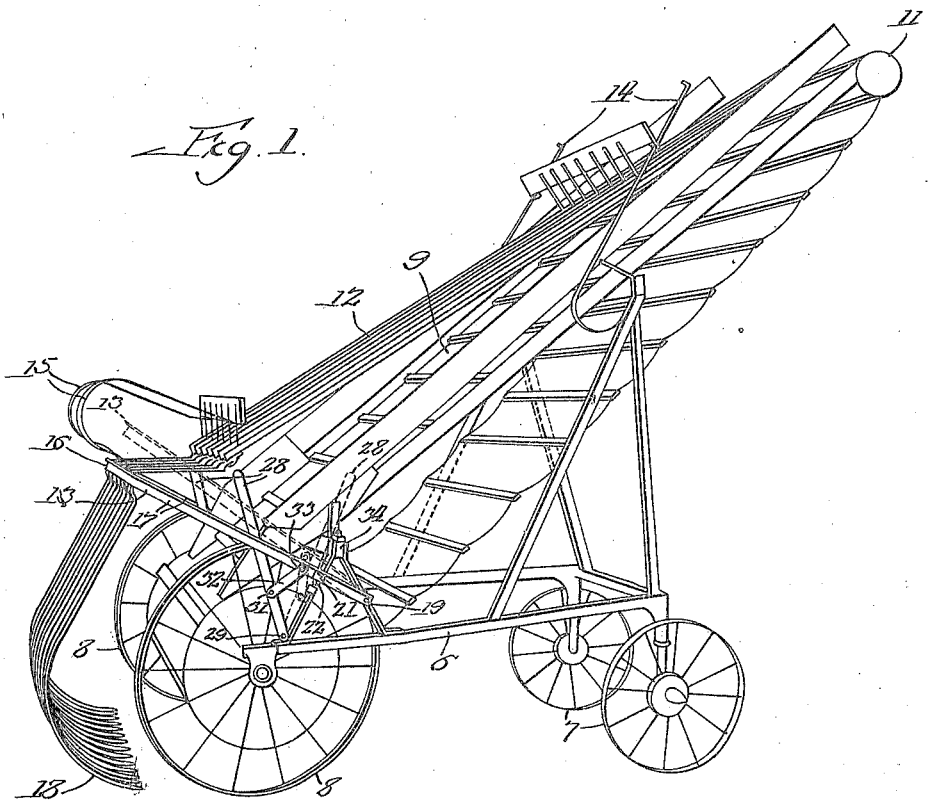

Jan. 9, 1923.

C. R. DAVIS.
HAYLOADER.
ORIGINAL FILED MAR. 14, 1918.

1,441,787.

Inventor:
Calvin R. Davis
By Ira J. Wilson
Atty.

Patented Jan. 9, 1923.

1,441,787

UNITED STATES PATENT OFFICE.

CALVIN R. DAVIS, OF ROCKFORD, ILLINOIS, ASSIGNOR TO EMERSON-BRANTINGHAM COMPANY, OF ROCKFORD, ILLINOIS, A CORPORATION OF ILLINOIS.

HAYLOADER.

Original application filed March 14, 1918, Serial No. 222,398. Divided and this application filed July 30, 1918. Serial No. 247,411.

*To all whom it may concern:*

Be it known that I, CALVIN R. DAVIS, a citizen of the United States, residing at Rockford, in the county of Winnebago and State of Illinois, have invented certain new and useful Improvements in Hayloaders, of which the following is a specification.

This invention, a division of my copending application Serial No. 222,398 for hayloaders, filed March 14, 1918, relates in general to the cylindrical type of hayloaders, and has more particular reference to the construction and manner of supporting the rake teeth which are carried at the rear of the gathering cylinder.

The chief object of the invention is to provide a rake and rake head of generally improved construction with the view to simplicity of design and the use of but very few parts which are capable of being manufactured at a comparatively low cost and will serve in a very practical manner the purposes desired.

I have also aimed to provide a novel means for moving the rake teeth to and from an operative position and for automatically locking them in elevated inoperative position upon being raised thereto, this means preferably taking the form of a toggle lever arrangement of very simple construction for raising each side of the rake head.

Other objects are to mount the rake head in an advantageous manner whereby the rake teeth may be easily adjusted into greater or less proximity to the ground and also whereby the rake head is free to rise without disturbing this adjustment, and to so form the rake teeth in connection with their attachment to the rake head as to prevent clogging and banking of the hay against the rake head.

Referring to the drawing,—

Figure 2:
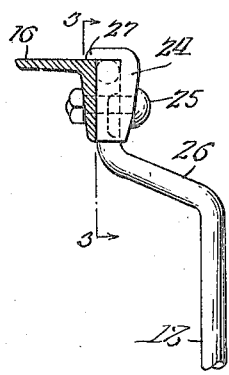
Figure 3:
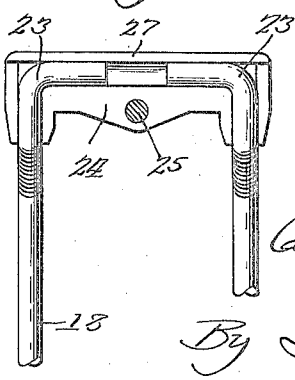

Figure 1 is a perspective view of a hayloader embodying my improvements;

Fig. 2, an enlarged cross-sectional view through the rake head illustrating the attachment of the rake thereto; and Fig. 3, a sectional view taken substantially on the line 3—3 of Fig. 2.

The hayloader illustrated in the drawing is of the cylinder type. Those parts of the loader not directly pertinent to my present improvements are not illustrated in detail as their particular construction is not essential. The parts shown comprise a frame 6 supported by front dirigible wheels 7 and rear traction wheels 8, an endless hay carrier or elevator 9 trained over idlers 11 mounted on the top of the frame, and side boards defining the sides of the inclined carrier way.

In operation, the hay is picked up by the gathering cylinder (co-axial with the traction wheels and not shown as the construction of such a cylinder is well known in the art), and delivered onto the carrier 9 and elevated thereby between the side boards until the top of the carrier way or elevating platform is reached, whereupon the hay is delivered or dropped onto the rack behind which the loader is drawn. Because of the inclination of the elevator, it is necessary to urge or slightly press the hay against the slats of the elevator in order to insure that the hay shall be carried along and shall not stop or be banked so as to clog the machine. It is also necessary to press the hay against the elevator to prevent the hay from being blown away. The compressor, designated generally by reference character 12, performs these functions and may be of any suitable or preferred construction. The construction and advantage of the particular compressor shown are fully described in my application mentioned above; and it is only necessary to state at this time that the compressor is supported at its lower end on the rake head or frame, designated generally by 13, and is full-floating as it were, on upper and lower spring members 14 and 15 respectively, and is free to yield upwardly and away from the elevator 9 to a considerable extent.

The rake head is preferably formed of a single piece of angle iron or its equivalent, bent to a general U-shape to provide a rear cross portion 16 and forwardly extending side members 17. The cross portion 16 serves as the direct means of support for the rake teeth 18, and the side members 17 are pivotally connected at their forward ends 19 to a fixed part of the main frame 6 so that the rake head may be swung at its rear end vertically about the pivots 19. The side members 17 of the rake head normally rest at 21 on adjustable set screws or stops 22 carried by the main frame structure, which determine the working position of the rake head. From this position the rake head and its teeth 18 are free to rise relatively to the main frame about the pivots 19 when passing over irregular ground.

It will be noted that the rake teeth 18 are arranged to pick up any loose hay missed by the rake teeth on the cylinder and to guide the hay forwardly to insure the proper entry of hay into the throat of the machine. The teeth, however, are constructed in a novel manner so that they may be easily detached when they are not necessary in the operation and so that when in use they will prevent the hay from lodging against or being obstructed by the head portion 16. As shown in Figs. 2 and 3, the rake teeth are connected in pairs to the rake head. Each rake tooth is bent at one end to form an elbow 23 which is adapted to be clamped or otherwise rigidly secured to one face of the head portion 16 by means of a bracket 24 and a bolt 25. In the present instance, the teeth are clamped to the forward upright wings of the angle iron head 16 and the shank portions of the teeth are bent forwardly as at 26, so as to lie in a plane substantially forward of the rake head for the purpose of preventing the hay as it passes upward and forward from becoming caught or in any way obstructed by the head. The bracket 24 is shaped on one face to provide a groove which receives the elbows of a pair of rake teeth and is further shaped to provide a ledge 27 adapted to engage the top of the angle iron head 16, so that by means of the single bolt 25 passing through the head a pair of rake teeth may be rigidly clamped to the head and precluded from any accidental displacement.

Means is now provided for raising the rake teeth to an inoperative position so that when the loader is transported idly the teeth will not strike the ground. This means, shown only in Fig. 1, consists of a lever 28 pivoted at 29 to the frame structure at each side of the loader and pivotally connected intermediate its ends at 31 by means of a link 32 to the rake head at the point 33. As already mentioned, the rake head normally rests on the set screws 22 carried by the main frame and is adapted to be swung upwardly about the pivots 19 for the purpose of widening the throat between the compressor and the elevator and for adjusting the teeth with respect to the ground, and as is now apparent for elevating the rake teeth to an inoperative position for transportation. By swinging the levers 28 forwardly, the rake head will be raised to an elevated position by means of the toggle connection between the head and frame provided by the levers 28 and the links 32. When the rake head has been fully elevated by movement of the levers to the postion indicated in dotted lines in Fig. 1, which position is limited by contact of the levers against the frame bar 34, the pivots 31 will have been moved past a dead-center line intersecting the pivots 29 and 33, so that due to the weight of the rake head, the latter will be automatically locked in elevated position. To lower the head, the levers 28 may be swung rearwardly past the dead-center locking position, whereupon the rake head will be free to swing downwardly under its own weight to the working position limited by the set screws 22. Upon elevating the rake teeth the compressor structure is simply shifted forwardly and upwardly by the rake head, it being manifest that the upper compressor structure will simply slide upwardly on the spring members 14. Thus the rake teeth will be raised and lowered without interfering in any respect with the operativeness of the compressor.

It is believed that the foregoing conveys a clear understanding of my improvements, and while I have illustrated but one working embodiment thereof, various changes might be made in the construction without departing from the spirit and scope of the invention as expressed in the appended claims.

I claim:

1. In a hay loader, the combination with hay gathering and elevating means, of a rake head pivotally mounted at its forward end and equipped at its rear end with rake teeth arranged to pick up hay at the rear of the gathering means, a toggle connection between the frame and rake head at a point on the latter intermediate its pivot and rake teeth and operable for raising the rake head, and means to operate it and to lock it in an elevated position.

2. In a hay loader, the combination with hay gathering and elevating means, of a rake head pivotally mounted at its forward end and equipped at its rear end with rake teeth arranged to pick up hay at the rear of the gathering means, a hand lever for each side portion of the rake head, and a link connection between each hand lever and the rake head arranged so that by operating the lever the rake head will be raised and the lever and link will be carried into substantially dead-center relation for locking the rake head in elevated position.

3. In a hayloader, the combination with a frame and hay gathering means, of a generally U-shaped rake head having its spaced arms pivotally connected at their forward ends to side portions of the frame and its cross portion extending transversely of the rear end of the loader and equipped with a plurality of depending rake teeth, and a set screw on the frame for each arm forming a seat upon which it rests, whereby to adjust and limit the working position of the teeth and to permit the rear end of the rake head to swing upwardly on its pivotal mounting when occasion requires.

CALVIN R. DAVIS.